United States Patent
Arnaboldi et al.

(10) Patent No.: US 11,093,459 B2
(45) Date of Patent: Aug. 17, 2021

(54) PARALLEL AND EFFICIENT TECHNIQUE FOR BUILDING AND MAINTAINING A MAIN MEMORY, CSR-BASED GRAPH INDEX IN AN RDBMS

(71) Applicant: Oracle International Corporation, Redwood Shores, CA (US)

(72) Inventors: Marco Arnaboldi, Zurich (CH); Jean-Pierre Lozi, Zurich (CH); Laurent Phillipe Daynes, Saint-Ismier (FR); Vlad Ioan Haprian, Zurich (CH); Shasank Kisan Chavan, Menlo Park, CA (US); Hugo Kapp, Zurich (CH); Sungpack Hong, Palo Alto, CA (US)

(73) Assignee: Oracle International Corporation, Redwood Shores (CA)

( * ) Notice: Subject to any disclaimer, the term of this patent is extended or adjusted under 35 U.S.C. 154(b) by 15 days.

(21) Appl. No.: 16/747,827

(22) Filed: Jan. 21, 2020

(65) Prior Publication Data

US 2021/0224235 A1    Jul. 22, 2021

(51) Int. Cl.
*G06F 16/30* (2019.01)
*G06F 7/00* (2006.01)
(Continued)

(52) U.S. Cl.
CPC ............ *G06F 16/211* (2019.01); *G06F 16/27* (2019.01); *G06F 16/284* (2019.01); *G06F 16/9024* (2019.01)

(58) Field of Classification Search
CPC ...... G06F 16/211; G06F 16/27; G06F 16/284; G06F 16/9024
(Continued)

(56) References Cited

U.S. PATENT DOCUMENTS 5,822,592 A    10/1998  Zhu
5,983,215 A    11/1999  Ross et al.
(Continued)

FOREIGN PATENT DOCUMENTS

WO    WO1999045479 A1    9/1999
WO    WO2015099562 A1    7/2015

OTHER PUBLICATIONS

Padmanabhan: "HDB-Subdue, A Relational Database Approach to Graph Mining and Hierarchical Reduction", (A Partial Fulfillment of the Requirements for the Degree of Master of Science in Computer Science and Engineering, The University of Texas at Arlington), Dec. 2005 (Year: 2005).*
(Continued)

*Primary Examiner* — Kuen S Lu
(74) *Attorney, Agent, or Firm* — Hickman Becker Bingham Ledesma LLP

(57) ABSTRACT

Herein are techniques that concurrently populate entries in a compressed sparse row (CSR) encoding, of a type of edge of a heterogenous graph. In an embodiment, a computer obtains a mapping of a relational schema to a graph data model. The relational schema defines vertex tables that correspond to vertex types in the graph data model, and edge tables that correspond to edge types in the graph data model. Each edge type is associated with a source vertex type and a target vertex type. For each vertex type, a sequence of persistent identifiers of vertices is obtained. Based on the mapping and for a CSR representation of each edge type, a source array is populated that, for a same vertex ordering as the sequence of persistent identifiers for the source vertex type, is based on counts of edges of the edge type that originate from vertices of the source vertex type. For the CSR, the computer populates, in parallel and based on said mapping, a destination array that contains canonical offsets
(Continued)

as sequence positions within the sequence of persistent identifiers of the vertices.

20 Claims, 7 Drawing Sheets

(51) Int. Cl.
    *G06F 16/21*     (2019.01)
    *G06F 16/27*     (2019.01)
    *G06F 16/28*     (2019.01)
    *G06F 16/901*     (2019.01)

(58) Field of Classification Search
    USPC .......................................................... 707/803
    See application file for complete search history.

(56) References Cited

U.S. PATENT DOCUMENTS

| | | | |
|---|---|---|---|
| 7,624,081 | B2 | 11/2009 | Zhao et al. |
| 7,849,106 | B1 | 12/2010 | Agrawal |
| 8,996,492 | B2 | 3/2015 | Paradies et al. |
| 9,195,941 | B2 | 11/2015 | Mojsilovic et al. |
| 9,672,656 | B1 | 6/2017 | McPhail |
| 10,268,610 | B1 * | 4/2019 | McKenney ............... G06F 9/52 |
| 10,599,656 | B1 | 3/2020 | Sharma |
| 2002/0184225 | A1 | 12/2002 | Ghukasyan |
| 2003/0195885 | A1 | 10/2003 | Emmick |
| 2005/0160432 | A1 | 7/2005 | Gallagher |
| 2011/0267351 | A1 * | 11/2011 | Curbera ................. G06Q 10/06 345/440 |
| 2011/0307685 | A1 | 12/2011 | Song |
| 2013/0212131 | A1 | 8/2013 | Reddy |
| 2013/0332387 | A1 | 12/2013 | Mirra et al. |
| 2014/0050417 | A1 | 2/2014 | Jiang |
| 2014/0177008 | A1 | 6/2014 | Raymond |
| 2014/0282384 | A1 | 9/2014 | Fanner |
| 2015/0026158 | A1 | 1/2015 | Jin |
| 2015/0081741 | A1 | 3/2015 | Xu |
| 2015/0120775 | A1 | 4/2015 | Shao et al. |
| 2015/0310644 | A1 | 10/2015 | Zhou et al. |
| 2015/0379054 | A1 | 12/2015 | Kernert |
| 2016/0019228 | A1 | 1/2016 | Hong |
| 2016/0063037 | A1 | 3/2016 | Savkli |
| 2016/0063132 | A1 | 3/2016 | Chen et al. |
| 2016/0071233 | A1 | 3/2016 | Macko et al. |
| 2016/0078344 | A1 | 3/2016 | Agarwal et al. |
| 2016/0140152 | A1 | 5/2016 | Sevenich et al. |
| 2016/0171068 | A1 | 6/2016 | Hardin |
| 2016/0179887 | A1 | 6/2016 | Lisonbee et al. |
| 2016/0259886 | A1 | 9/2016 | Li |
| 2016/0299991 | A1 | 10/2016 | Hong et al. |
| 2016/0306922 | A1 | 10/2016 | Van Rooyen |
| 2017/0091246 | A1 * | 3/2017 | Risvik ................. G06F 16/9024 |
| 2017/0169133 | A1 | 6/2017 | Kim |
| 2017/0293697 | A1 | 10/2017 | Youshi et al. |
| 2018/0137667 | A1 | 5/2018 | Kindelsberger |
| 2018/0246986 | A1 | 8/2018 | Haubenschild |
| 2018/0329958 | A1 * | 11/2018 | Choudhury ......... G06F 16/2343 |
| 2018/0357329 | A1 | 12/2018 | Meyer |
| 2019/0121810 | A1 * | 4/2019 | Zhuang ............... G06F 16/2365 |
| 2019/0325075 | A1 | 10/2019 | Hilloulin |
| 2020/0265090 | A1 | 8/2020 | Hilloulin |
| 2021/0073233 | A1 | 3/2021 | Chavan et al. |

OTHER PUBLICATIONS

Zhou et al., "Implementing Database Operations Using SIMD Instructions", ACM SIGMOD 'Jun. 4-6, 2002, Madison, Wisconsin, USA, 12 pages.

Anonymous, "Universally Unique Identifer", Wikipedia, dated Feb. 13, 2018, www.web/2018020325/https://en.wikipedia.org/wiki/Universally_unique_identifer, 10 pages.

Ahmed Elgohary et al., "Compressed Linear Algebra for Large-Scale Machine Learning", VLDB Journal, No. 27, No. 5, dated Sep. 12, 2017, pp. 719-744.

Yousfi, U.S. Appl. No. 15/096,034, filed Apr. 11, 2016, Office Action dated Apr. 10, 2018.

Yousfi, U.S. Appl. No. 15/096,034, filed Apr. 11, 2016, Notice of Allowance dated Feb. 14, 2019.

Yousfi, U.S. Appl. No. 15/096,034, filed Apr. 11, 2016, Interview Summary dated Nov. 23, 2018.

Yousfi, U.S. Appl. No. 15/096,034, filed Apr. 11, 2016, Final Office Action dated Sep. 20, 2018.

Yousfi, U.S. Appl. No. 15/096,034, filed Apr. 11, 2016, Advisory Action dated Dec. 5, 2018.

Haubenschild, U.S. Appl. No. 15/443,327, filed Feb. 27, 2017, Notice of Allowance dated Nov. 2, 2018.

Cruanes, U.S. Appl. No. 15/716,345, filed Sep. 26, 2017, Notice of Allowance dated Nov. 21, 2019.

Merril et al., Scalable GPU Graph Traveral, dated 2012, 11 pages.

De Virgilio et al., "Converting Relational to Graph Databases", Proceedings of the First International Workshop on Graph Data Management Experience and Systems (GRADES 2013), Jun. 23, 2013, 6 pages.

Ediger et al., "STINGER: High Performance Data Structure for Streaming Graphs", IEEE, dated 2012, 5 pages.

Farber et al., "The SAP HANA Database—An Architecture Overview" IEEE, dated 2012, 6 pages.

Hassan, "Extending In-Memory Relational Database Engines with Native Graph Support", dagted Mar. 2018, 12 pages.

Hong et al., "PGX.D: A Fast Distributed Graph Processing Engine", SC, dated Nov. 2015, Austin TX, USA, 12 pages.

IMB Knowledge Center, "Expand Your IBM Z Capabilities", dated Nov. 20, 2019, 3 pages.

Kaur, Sawinder, "Visualizing Class Diagram Using OrientDB NoSQL Data-Store", dated Jul. 2016, 5 pages.

Kesheng Wu et al., "A Performance Comparison of Bitmap Indexes", proceedings of the 2001 ACM CIKM 10th International Conference on Information and Knowledge Management, dated Oct. 5, 2001, 2 pages.

Macko et al., "LLAMA: Efficient Graph Analytics Using Large Multiversioned Arrays." In Proceedings of the 31st IEEE International Conference on Data Engineering, dated Apr. 13-17, 2015, 13 pages.

Dave et al., "GraphFrames: An Integrated API for Mixing Graph and Relational Queries", ACM, dated 2016, 8 pages.

Merril et al., High Performance and Scalable GPU Graph Traversal, dated 2015, 30 pages.

Yonathan Perez et al., Ringo: Interactive Graph Analytics on Big-Memory Machines:, Proc ACM SIGMOD Int Conference Manag Data. Dated May-Jun. 2015, 21 pages.

Nick Quinn, "Making sense of the graph revolution", www.JAXenter.com, dated Sep. 2013, 5 pages.

Oracel Help Center, "Pseudoclumns", dated Nov. 20, 2019, 1 page.

Oracel Help Center, "ROWID Pseudocolum", dated Nov. 20, 2019, 2 pages.

Oracle, "Using Property Graphs in an Oracle Database Environment", docs.oracle.com/database/122/SPGDG/using-property-graphs-oracle-database.htm#BDSPA191, Apr. 23, 2018, Apr. 23, 2018, 152 pages.

SQL Server Blog, "Graph Data Processing with SQL Server 2017 and Azure SQL Database", dated Aug. 20, 2017, 8 pages.

Valiyev, Mahammad, "Graph Storage: How Good is CSR Really?", dated Dec. 10, 2017, 8 pages.

Wheatman et al., "Packed Compressed Sparse Row: A Dynamic Graph Representation", dated 2018,7 pages.

Xirogiannopoulos et al., "Extracting and Analyzing Hidden Graphs from Relational Databases", ACM, SIGMOD dated 2017, 18 pages.

Xirogiannopoulos et al., "GraphGen: Exploring Interesting Graphs in Relational Data", Proceedings of the VLDB Endowment, vol. 8, No. 12 Copyright 2015 VLDB Endowment, 4 pages.

Mathew et al., "An Efficient Index based Query handling model for Neo4j", International Journal of Advances in Computer Science and Technology (IJACST), vol. 3 No. 2, dated 2014, 7 pages.

(56) References Cited

OTHER PUBLICATIONS

Hilloulin, U.S. Appl. No. 15/956,115, filed Apr. 18, 2018, Office Action dated Jun. 19, 2020.
Prokopec et al., "Lock-Free Resizeable Concurrent Tries", dated 2011, 15 pages.
Prokopec et al., "Concurrent Tries with Efficient Non-Blocking Snapshots", dated Feb. 25-29, 2012, New Orleans, Louisiana, USA, 11 pages.
Prokopec et al. "Cache-Aware Lock-Free Concurrent Hash Tries", dated Jun. 14, 2011, 14 pages.
Bagwell, Phil, "Ideal Hash Trees", dated 2001, 19 pages.
Wikipedia, the free encyclopedia, "Subgraph isomorphism problem", https://en.wikipedia.org/wiki/Subgraph_isomorphism_problem, last viewed on Jan. 29, 2021, 4 pages.
Wikipedia, the free encyclopedia, "PageRank", https://en.wikipedia.org/wiki/PageRank, last viewed on Jan. 29, 2021, 16 pages.
Wikipedia, the free encyclopedia, "Isolation (database systems)", https://en.wikipedia.org/wiki/Isolation_(database_systems), last viewed on Jan. 29, 2021, 8 pages.
Wikipedia, the free encyclopedia, "Fetch-and-add", https://en.wikipedia.org/wiki/Fetch-and-add, last viewed on Jan. 29, 2021, 4 pages.
Wikipedia, the free encyclopedia, "Bellman-Ford algorithm", https://en.wikipedia.org/wiki/Bellman%E2%80%93Ford_algorithm, last viewed on Jan. 29, 2021, 6 pages.
Segalini et al., "Patent: efficient identification of vertices and edges for graph indexes in an RDBMS", dated Nov. 2015, 12 pages.
SAP.dom, "SAP HANA Graph Reference", SAP HANA Platform 2.0 SPS 03 Document Version: 1.1 dated Oct. 31, 2018, 84 pages.
SAP.com, "SAP HANA", Harness the power of an in-memory database with SAP HANA, SAP Business Technology Platform, https://www.sap.com/products/hana.html, last viewed on Jan. 29, 2021, 19 pages.
Microsoft.com, "SQL Sever 2019"https://www.microsoft.com/en-us/sql-server/sql-server-2019, last viewed on Jan. 29, 2021, 8 pages.
Microsoft Docs, "Graph processing with SQL Server and Azure SQL Database",docs.microsoft.com/en-us/sql/relational databases/graphs/sql-graph-overview?view=sql-server-ver15, dated Jun. 26, 2019, 5 pgs.
Hong et al., "PGX.D: A Fast Distributed Graph Processing Engine", SC '15, dated Nov. 15-20, 2015, Austin, TX, USA, 12 pages.
Graph Query Language GQL, "GQL Standard", https://www.gqlstandards.org/home, last viewed on Jan. 29, 2021, 2 pages.
Hilloulin, U.S. Appl. No. 15/956,115, filed Apr. 18, 2018, Notice of Allowance, dated May 7, 2021.

\* cited by examiner

PARALLEL AND EFFICIENT TECHNIQUE FOR BUILDING AND MAINTAINING A MAIN MEMORY, CSR-BASED GRAPH INDEX IN AN RDBMS

FIELD OF THE INVENTION

The present invention relates to loading a heterogeneous graph into memory from tables of a relational database. Herein are techniques that concurrently construct a main-memory representation of a property graph, such as, one or more compressed sparse row (CSR) encodings of the vertices and edges of the graph.

BACKGROUND

Demand is growing for graph analytics on data that resides in relational database management systems (RDBMS). Known solutions entail constructing graphs outside of the RDBMS storing the data of interest. One solution entails constructing graphs in a dedicated graph analytic engine. Another solution entails migrating data to a graph database. These solutions are undesirable because they substantially increase the complexity of data management in an enterprise and lead to significant loading/data transfer costs to external engines.

With a state of the art RDBMS, performance of graph analytics (such as graph pattern match querying, or graph algorithms execution, or a combination of both) directly upon relational tables is notably worse than performance offered by dedicated graph engines, especially for interesting algorithms such as PageRank. Typically an RDBMS fulfils a graph algorithm as a succession of table joins that are slow and require burdensome materialization of short lived intermediate results.

Some queries such as path finding queries are better expressed as a graph query than a relational query such as standard query language (SQL). For example, a topological query may be better expressed as a regular expression or a context free expression, which are not readily expressed as SQL. An RDBMS that expects only queries that are SQL and/or tabular typically does not have data structures that are dedicated to graph analytics. In these ways, a state of the art RDBMS may be too slow for graph analytics.

DETAILED DESCRIPTION

Figure 1:
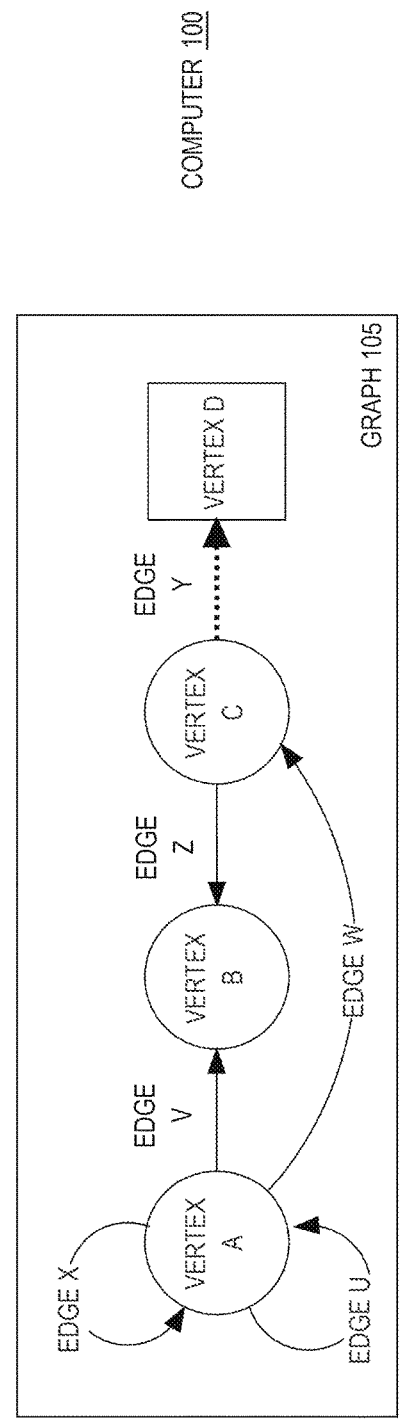
FIG. 1 is a block diagram that depicts an example computer that uses parallelism to accelerate population of a compressed sparse row (CSR) encoding for a logical graph.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Herein are techniques that concurrently populate entries in a memory aggregation, such as a compressed sparse row (CSR) encoding, of a type of edge of a logical graph such as a property graph. Graph analytics support may need efficient in-memory graph indices in order to provide performance that is competitive to dedicated main-memory graph analytic engines. CSR encodings are graph topology indices that make navigation through graph elements quick, speeding up workloads such as graph pattern matching queries and computationally or navigationally intensive graph algorithms such as PageRank. Herein are ways to efficiently construct an in-memory index for a graph defined over existing relational tables that can seamlessly integrate with an in-memory storage feature provided by a relational database management system (RDBMS).

Explained herein is how to efficiently build a main memory representations of graph indices that exploit CSR representations and seamlessly integrate with in-memory columnar representations of relational database tables that participate in providing content of the graph. Solutions herein address major challenges:

Support for CSRs of different respective graph element types. This feature gives users maximum expressive power based on types and normalizations of legacy data that users are familiar with.

Heterogeneous extended topology support. This feature lets users define graphs of any shape and any mix of graph element types.

Performance. CSR may be the most efficient data structure to use in order to navigate through relationships of a graph. Challenges to graph analytic performance are twofold: efficiently building CSRs from relational/tabular data and having quick access to a graph topology through the CSRs.

RDBMS integration. CSR population (and the graph model) may seamlessly integrate with legacy, standard, and/or optimized features of a modern RDBMS. Identified herein are suitable features to exploit, including how to perform CSR creation, maintenance, and use within an RDBMS.

Maintenance is presented, including how to efficiently maintain a catalog of a main memory CSR based heterogeneous graph representation in a RDBMS and how to use it on demand to represent one or more property graphs defined by user(s). A generalized heterogeneous graph data modeling approach is presented to make graphs richer in types, contexts, and aggregations and comparable to those in relational databases. A graph data model herein is defined over many relational tables (not just two) acting as graph vertex or graph edge containers. This solves both the heterogeneity and the extended topology challenges.

No changes to legacy database schema are needed. Techniques herein allow users to define graphs and engage in-memory acceleration without any changes to their schemas or table contents. No supplemental tables are needed. A legacy schema may work as is.

Techniques herein directly and seamlessly tap into RDBMS main memory with some or all memory management provided by the RDBMS. Memory interfaces herein seamlessly integrate with existing and well optimized mechanisms provided by a modern RDBMS. Herein is a new kind of relational table pseudocolumn in order to provide a queryable dematerialized vertex/edge identifier that helps the RDBMS both to efficiently build CSRs and also to have a negligible memory footprint for the main memory representation for tables.

Graph index sharing is presented herein. For example, a system herein may maintain a dictionary that inventories some or all instances of CSRs. CSRs can be transparently and automatically shared across multiple (wholly or partially) overlapping graphs defined in a database. Herein are memory storage formats that can reduce both the memory footprint and the time to construct the main memory representation of a graph, such as when multiple graphs overlap in terms of the edge and vertex tables they use.

Coarse and fine grained parallel population of in memory aggregations and indices are presented. Parallel construction of CSRs may be accelerated with chunking. This feature can be seamlessly integrated with any kind of preexisting engine for main memory columnar representation.

Herein is an in-memory graph index that exploits the CSR representation of a graph while being integrated with the main memory columnar representation of a database. Construction of main memory representation for a specific graph may be an optional feature in some embodiments. Database administrators and power users may control which graphs can consume main-memory resources for graph processing acceleration.

Construction of the main memory representation for a graph may be performed concurrent to user requests (especially, requests for executing graph algorithms or graph pattern match querying). User requests are not blocked by graph index building operations. This solution allows the system to further address performance challenges by letting the user trade memory for performance improvements without interrupting service. Although some embodiments apply to a main-memory columnar database, some embodiments support the more sophisticated case of a dual store system combining a persistent row-store with an optional columnar in-memory store, such as with an Oracle RDBMS.

In an embodiment, a computer obtains a mapping of a relational schema to a graph data model. The relational schema defines: a) vertex tables that correspond to respective vertex types in the graph data model, and b) edge tables that correspond to respective edge types in the graph data model. Each edge type is associated with a respective source vertex type and a respective target vertex type.

For each vertex type, a sequence of persistent identifiers of vertices for the vertex type is obtained. Based on the mapping and for a respective CSR representation of each edge type, the computer populates a source array that, for a same vertex ordering as the sequence of persistent identifiers for the source vertex type of the edge type, is based on counts of edges of the edge type that originate from vertices of the source vertex type. For the CSR representation of each edge type, the computer populates, in parallel and based on said mapping, a destination array that contains canonical offsets as sequence positions within the sequence of persistent identifiers of vertices of the target vertex type.

1.0 EXAMPLE COMPUTER

FIG. 1 is a block diagram that depicts an example computer 100, in an embodiment. Computer 100 uses parallelism to accelerate population of compressed sparse row (CSR) encoding 110 of logical graph 105. Computer 100 may be at least one rack server such as a blade, a personal computer, a mainframe, a virtual computer, or other computing device. When computer 100 comprises multiple computers, the computers are interconnected by a communication network.

Graph 105 is a directed graph that contains vertices A-D and directed edges U-Z that interconnect vertices A-D as shown. Graph 105 is an instance of graph data model 130 that contains vertex types 141-142 and edge types 151-152, as shown in the element type column of graph data model 130. The display column of graph data model 130 is a demonstrative legend for graph instances such as 105. For example and according to the display column, edge Y is shown as a dotted line that indicates that edge Y is an instance of edge type 152

Graph data model 130 may define properties (not shown) and types of vertices and edges. For example, vertex type 141 may have an age property and a color property, some, none, or all of which may also be properties of vertex type 142. According to graph data model 130, each edge type has a respective source vertex type and target vertex type, either, none, or both of which may be identical to other edge types. For example, both edge types 151-152 have a same source vertex type 141, but different respective target vertex types 141-142.

For edge type 151, the source vertex type is also the target vertex type, which facilitates self-directed edges, such as X, that originate and terminate at a same vertex. A first vertex may be redundantly connected in a same direction or opposite directions to a same second vertex by multiple edges of a same or different edge type. For example, edges U and X redundantly connect vertex A to itself.

In operation, graph 105 is loaded for analytics into volatile or non-volatile memory as various columnar vectors. The contents of a vector are homogeneous as to element data type, although different vectors may have different content data types. For example, a vector may store values of a same property of vertices or edges of a same type. A vector may store a system property of a graph element, such as identifiers of vertices of vertex type 141. A vector may store an application property of a graph element, such as shipping status of vertices of vertex type 141.

Although elements of a same vector are stored contiguously in memory, multiple vectors of different respective properties of a same graph element type need not be adjacent in memory. Multiple vectors of different respective properties of a same graph element type should have a same amount of elements, and contents of those vectors should be identically ordered. For example for vertex type 141, a color or age of vertex A should occur at a same offset in each of respective color and age property vectors. That offset may operate as a canonical offset to access all properties of a same vertex or edge. A canonical offset may also be known herein as an internal identifier, a volatile identifier, or an in-memory graph topology identifier (IMGTID).

As used herein, an in memory array for one graph element type may, depending on the context, be a single property vector or a logical aggregation of multiple different property vectors that accept a canonical offset of the graph element type as an offset. Each graph element type has its own zero based increasing sequence of canonical offset values. Computer 100 is careful not to confuse canonical offset values of different graph element types, even though such offsets are syntactically interchangeable. Canonical offsets are not semantically interchangeable.

A canonical offset uniquely identifies a vertex or edge within its vertex type or edge type. A canonical offset is not globally unique. Vertices and/or edges of different types may unintentionally share a same canonical offset. For example, zero may be the same canonical offset of both vertex A and D that have different vertex types.

In an embodiment, uniqueness of a canonical offset is guaranteed only for a same graph instance. If graph data model 130 describes multiple graph instances that concurrently reside in memory, then each graph instance has its own set of vertex arrays and edge arrays. For example and regardless of whether or not two graph instances share same graph data model 130, if the two graph instances share vertex type 141, then there are two separate vertex arrays with separate property vectors for same vertex type 141. Thus, canonical offsets of vertices of same vertex type 141 for two graph instances should not be confused.

In an embodiment, graph instances may partially overlap to share vertex(s) and/or edge(s). Even for graph instances that do not share metadata 120, 130, and/or 160, graph instances may share some CSRs, vectors, or arrays when vertex type(s) and/or edge type(s) are shared. For example, such aggregation and/or index structures may store a union of both graph instances for one, some, or all graph element types. In an embodiment, only metadata 120, 130, and/or 160 may be shared, but graph instance content is not shared.

Loading any or every graph element type into memory may create at least one property vector per graph element type. Thus, every vertex type and edge type has a non-empty logical set of property vectors. For a vertex type, that logical set of vectors is known herein as a vertex array, which is logically tabular. For an edge type, that logical set of vectors is known as an edge array, which is logically tabular.

Thus, vertex types 141-142 and edge types 151-152 each has a respective vertex array or edge array of property vectors. Herein, all internal identifiers of graph elements in memory are canonical offset values into a vertex array or edge array of a respective graph element type. Every graph element type has its own zero based, dense, ascending, and continuous sequence of non-negative integer values that is valid while graph 105 is loaded in memory and until graph 105 is evicted from memory and/or reloaded into memory as explained later herein.

Some property vector(s) in one graph element type's array may store canonical offsets of another graph element type for cross referencing. For example, an edge array may have a property vector that stores canonical offsets of vertices of the target vertex type of the edge type. Thus, various graph element arrays may be related to each other, which is sufficient to encode the entire topology of graph 105.

Graph 105 is loaded from a relational database having relational schema 160 that defines vertex tables 171-172 and edge tables 181-182. Relational schema 160 defines the persistence format of data for graph 105, and graph data model 130 defines an analytical format that is suitable for graph analytics in memory. For example, each row of vertex table 171 may be a persistent representation of a respective vertex of vertex type 141. For example, vertex A may be stored as a row in vertex table 171, and vertex D may be stored in vertex table 172.

Mapping 120 is more or less a data binding between graph data model 130 and relational schema 160. Mapping 120 may be bi-directional to facilitate data reformatting during loading or persisting. In an embodiment, rows of mapping 120 are stored as rows in a mapping table, such as in relational schema 160 or in a different schema and/or database. In an embodiment, mapping 120 is instead persisted to a separate data file or interactively entered during operation.

Although not shown, mapping 120 may contain finer or coarser grained bindings than a one-to-one mapping of tables to vertex types. For example, mapping 120 may contain a query predicate that can selectively bind rows of a vertex table to different respective vertex types based on content of vertex table rows. Likewise, mapping 120 may contain a query union or query join that can bind a vertex type to multiple vertex tables.

Semantics of mappings, such as 120, provide flexibility to facilitate various scenarios. For example, multiple database instances may share a same relational schema 160 but have different content per database instance in the relational tables, and a same graph data model 130 and mapping 120 may be used to generate a separate graph instance for each of the database instances. Different mappings, such as 120, may each map a same relational schema 160 to different respective graph data models. Different mappings, such as 120, may each map different respective relational schemas to a same graph data model.

Mapping 120 provides flexibility for various structural normalization, renormalization, or denormalization scenarios. For example, each vertex table row may map to a vertex, and each edge table row may map to an edge. An edge table may have a foreign key to a vertex table, or vice versa. Those and the following mapping details, such as which table columns are primary or foreign keys and how those keys are used and associated with graph element types, are specified in mapping 120.

Polarity of table relationships may vary. For example, an edge table, which connects two vertex tables, may have a foreign key of one vertex table, and the other vertex table may have a foreign key of the edge table. The edge table may be an associative table that has two foreign keys respectively for both connected vertex tables. An edge table may have no foreign keys, such as when both connected tables have the foreign key of the edge table. An edge type need not have any edge table, such as when one vertex table has a foreign key of another vertex table.

There may be some overloading of a table row such that mapping 120 may map a same row of a same vertex table to multiple vertex types. For example, the same row may have two columns with different respective foreign keys for different respective relationships that map to different respective edge types that have different respective source vertex types and/or different respective target vertex types.

Various embodiments of mapping 120 may contain various kinds of binding tuples such as any of:
  (relational table, graph element type)
  (source vertex type, edge type, target vertex type)
  (source vertex table, edge table, target vertex table)
  (source primary key, source foreign key, target primary key, target foreign key).

An embodiment may partially or entirely combine those kinds of tuples to achieve other kinds of tuples instead.

In the many ways presented above there is ample flexibility such that mapping 120 may be reused with different database instances, such as a January sales database and a February sales database, and different mappings can: a) adapt different respective relational schemas to a same graph data model, and/or b) adapt different respective graph data models to a same relational schema. For example two different mappings may alternatively map a same edge table to different respective edge types that differ only in direction in different respective graph data models. For example, both edge types may connect a same two vertex types such that one edge type uses one vertex type as a source vertex type, and the other edge type instead uses the same vertex type as a target vertex type. Thus, foreign key polarity and edge type direction may or may not be related.

Such adaptabilities may facilitate integration with a legacy database without disturbing its legacy schema and thereby future proofing the legacy schema and legacy content. Thus, reuse and/or repurposing of mappings, relational schemas, graph data models, and/or database content is facilitated.

Mapping 120 is metadata that need not provide actual content of any particular graph instance such as 105 for analytics. The analytic representation of graph 105 is based on a compressed sparse row (CSR) aggregation, such as 110, for topological encoding in memory such as volatile dynamic random access memory (DRAM). As shown, CSR 110 encodes only edges of edge type 151. Other edge types may each have a separate CSR.

CSR 110 contains arrays 190 and 195 that, although shown as tabular, are integer vectors of a respective single column whose actually stored content is shown as bold. Columns in CSR 110 that are not shown as bold are implied columns that may be demonstrative and not actually stored.

Vertices and edges of graph 105 are topologically encoded into CSRs, such as 110 for edge type 151, as follows. Each edge type has its own CSR that has its own source array, such as source array 190. Each row of source array 190 represents a distinct vertex of vertex type 141 that is the source vertex type of edge type 151. Each edge type has its own edge array, such as destination array 195 for edge type 151. Each row of destination array 195 represents a distinct edge of edge type 151.

Each edge type has its own CSR, such as CSR 110 for edge type 151. Although multiple edge types 151-152 share a same source vertex type 141, respective CSRs of edge types 151-152 have their own respective source arrays.

Source array 190 contains an edge position vector that contains offsets of rows of destination array 195. Values in the edge position vector of source array 190 are monotonically increasing to indicate a starting position of a subsequence of rows of destination array 195 that represent edges of edge type 151 that originate from the vertex of a given row of source array 190. For example in source array 190, vertex A originates edges of edge type 151 that are represented as contiguous respective rows starting at row 0 of destination array 195. Each value in the edge position vector of source array 190 may be calculated by adding, to the previous value, a count of edges of edge type 151 that originate from the previous vertex of the previous row of source array 190.

For example, vertex A originates four edges U-X of edge type 151, which are represented by rows 0-3 of destination array 195. Thus, zero+four=four is the value in the edge position vector of source array 190 for vertex B. Likewise, vertex B originates no edges, and thus four+zero=four is the value in the edge position vector of source array 190 for vertex C. In an embodiment, a last entry in the edge position vector of source array 190 contains a count of edge of edge type 151, which also is a count of rows in destination array 195.

Each edge row of destination array 195 indicates, in the vertex position vector, an offset of a row in a vertex array of target vertex type 141, which in this case may be or include source array 190 as explained below. For example, the vertex position vector of destination array 195 indicates that edge V terminates at the vertex in row 1 of source array 190, which is vertex B.

By using only the edge position vector of source array 190, computer 100 can detect that vertex A originates four edges of edge type 151 by subtracting adjacent values. By using destination array 195 after using source array 190, computer 100 can further detect that those four edges terminate at vertices A-C. With a separate CSR for each edge type, the entire topology of graph 105 may be densely encoded and rapidly traversed.

Arrays 190 and 195 are both shown as having both vertex position and edge position columns or vectors. All of those columns/vectors contain canonical offsets of graph elements that, for a given column or vector, are for a single graph element type. In source array 190, the vertex position column contains canonical offsets for vertex type 141, and the edge position vector contains canonical offsets for edge type 151.

In destination array 195, the edge position column contains canonical offsets for edge type 151, and the vertex position vector contains canonical offsets for vertex type 141. The edge position vector and column of respective arrays 190 and 195 in same CSR 110 should be for a same edge type. The vertex position column and vector of respective arrays 190 and 195 in same CSR 110 may or may not be for a same vertex type, depending on whether or not the source vertex type and target vertex type of edge type 151 are identical.

Although arrays 190 and 195 are shown as contents of CSR 110, those arrays may also logically be vertical slices of graph element arrays in some embodiments. For example in an embodiment, source array 190 may be a subset of columns of the vertex array for vertex type 141. In any case, source array 190 and the vertex array for vertex type 141 have a same amount and ordering of vertices.

Edge types 151-152 have separate CSRs with separate source arrays with separate edge position vectors even though edge types 151-152 both have same source vertex type 141. In an embodiment, those separate edge position vectors may also be separate columns in a same vertex array for vertex type 141.

In an embodiment, destination array 195 may be a subset of columns of the edge array for edge type 151, in which case destination array 195 and the edge array for edge type 151 have a same ordering of edges. In another embodiment, destination array 195 and the edge array for edge type 151 may have a different ordering of edges, so long as there is a mapping between those orderings as explained later herein. In any case, destination array 195 and the edge array for edge type 151 have a same amount of edges.

Presented herein are techniques for populating entries of a same CSR in parallel for acceleration in shared memory, such as by symmetric multiprocessing (SMP) such as with a multicore processor. For example, graph 105 may be huge such as having billions of vertices, trillions of edges, and/or a diameter of tens or hundreds of thousands of vertices. For example, temporal feasibility may depend on horizontally scaled populating of a same CSR according to synchronization and coordination techniques herein.

In an embodiment, memory structures such as CSRs and vertex tables are optional. The following data definition language (DDL) statement may designate my_graph 105 as eligible for loading into memory, where owner is a user or schema.

ALTER PROPERTY GRAPH [owner.]my_graph INMEMORY

A similar DDL statement may designate graph 105 as no longer eligible for memory loading. In an embodiment and as discussed later herein, computer 100 exposes graph 105 to clients in a same way, regardless of whether or not graph 105 resides in memory. For example if graph 105 does not reside in memory, then computer 100 applies data manipulation language (DML) statements such as standard query language (SQL) to a database that contains relational schema 160 and its tables to, on the fly, perform filtration, joins, and projection as needed to retrieve a result set that represents graph 105 or a particular graph data element or all instances of a particular graph data element type.

Also as described later herein, loading some or all of graph 105 into memory may asynchronously occur in a background process such that: a) a client request is more or less entirely delegated for query processing to a database management system (DBMS) that is hosted by computer 100 or a different computer, b) but a repetition of the same request is instead solely applied to graph 105 in memory during the same graph analysis session. Various embodiments may incorporate some or all of computer 100's graph processing functionality into the DBMS itself. For example, the DBMS on computer 100 may operate as both a relational database engine and a graph database engine.

Also as described later herein, graph 105 may be loaded and/or unloaded to/from memory in a piecemeal way that is synchronous to a client request or asynchronous such as in the background. For example, CSRs and/or vertex tables are individually loaded into memory as driven by demand and individually evicted from memory as driven by memory scarcity. In another example as described later herein: a) horizontal and/or vertical slices of vertex tables and/or edge tables have their data stored into memory chunks; b) each chunk may be individually loaded or evicted; and c) multiple chunks may load in parallel from same or different relational table(s). Thus, fulfilment of a client request may entail a mix of accessing database tables and memory.

2.0 CSR INITIALIZATION PROCESS

Figure 2:
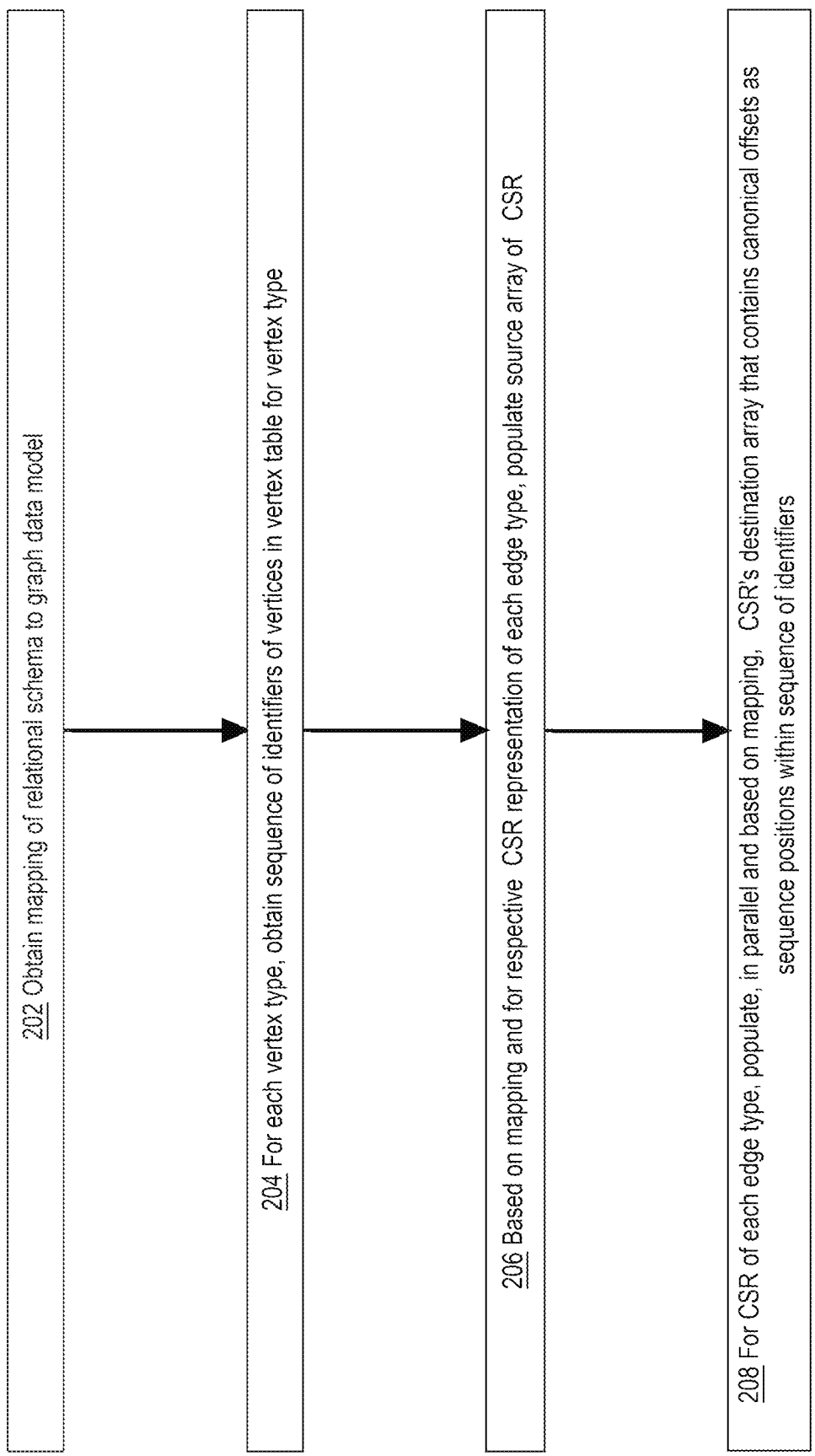
FIG. 2 is a flow diagram that depicts an example process that uses parallelism to accelerate population of a CSR encoding for a logical graph.

FIG. 2 is a flow diagram that depicts an example process that computer 100 may perform for constructing CSRs for graph 105, including populating entries of destination array 195 in parallel. FIG. 2 is discussed with reference to FIG. 1. Parallel population of portions of source array 190 is presented later herein.

Step 202 obtains, as presented earlier herein, mapping 120 that binds relational schema 160 to graph data model 130. For example, mapping 120 may comprise a lookup table whose keys are relational table names and whose values are vertex type names. Mapping 120 may specify source and target vertex types for each edge type. Mapping 120 may be manually composed or automatically derived such as by analyzing graph data model 130 and relational schema 160.

For each vertex type, step 204 obtains a sequence of persistent identifiers of vertices in a vertex table for the vertex type. As shown in the source vertex column of source array 190, the persistent identifier sequence for vertex type 141 is A, B, C, which may or may not be retrieved from identifying column(s) of vertex table 171. For example, such identifying column(s) of vertex table 171 may be a primary key, a secondary key such as a natural key, a pseudocolumn such as a row identifier (ROWID), and/or a compound key from multiple columns of vertex table 171. No semantics need be imposed on an identifying column except that, by itself or as part of a compound key, there are no duplicate values, which would prevent identification of a particular row of vertex table 171.

Regardless of whether or not based on identifying column(s), a persistent identifier should facilitate random access of a particular vertex or edge row in a database table. For a graph element type, the persistent identifier sequence may be unsorted and sparse with gaps. For example, a persistent identifier may have domain semantics, such as a postal address. Although possibly unsorted, the persistent identifier sequence is ordered, whether or not intentionally so.

For example once loaded into memory, vertex A is always ordered before vertex B, regardless of whether or not that ordering arises from vertex table 171 itself. However, if vertices A-C are later reloaded into memory, the ordering may change, regardless of whether or not the ordering of rows in vertex table 171 is changed. For example, a physical ordering of rows in vertex table 171 may be somewhat unstable, such as due to table compaction. Likewise, apparent table row ordering may be affected by database caching of disk blocks or table rows. Thus, CSRs may be implemented as volatile and regenerated whenever graph 105 is reloaded into memory, including repeating step 204.

Based on mapping and for a respective CSR of each edge type, step 206 populates a source array of the CSR as discussed earlier and later herein. Vertices are ordered in the source array, such as 190, according to the (e.g. unsorted) order of their persistent identifiers as determined in step 204. For example, steps 204 and 206 may preserve the order of vertices as retrieved from vertex table 171. In an embodiment and as discussed later herein, populating the edge position vector of source array 190 entails a group-by-join query to obtain a count of outgoing edges per source vertex.

A mapping such as a lookup table may be generated to bind canonical offsets of vertex type 141 to persistent identifiers of vertex type 141. For example, the vertex position and source vertex columns of source array 190 may be stored together as a lookup table. In an embodiment, the lookup table has only the source vertex column as a stored property vector, and the vertex position column is implied. Parallel population of portions of source array 190 is presented later herein.

In an embodiment, a lookup table may be avoided by instead using other native mechanism(s) of a DBMS, such as columnar caching with chunks such as in memory compression units (IMCUs) that have the same columns that a lookup table would have. Chunked caching as a native DBMS mechanism is discussed later herein.

For the CSR of each edge type, step 208 populates, in parallel and based on mapping 120, entries of the CSR's destination array. For example, destination array 195 may be an edge array and loaded from a respective edge table. However, the ordering of edges within destination array 195 should entail grouping of edges by source vertex, regardless of ordering of edge rows in edge table 181. Within a group of edges of a same source vertex, the edges may be arbitrarily ordered. A mapping such as a lookup table may be generated to bind array offsets of destination array 195 to persistent edge identifiers. For example, the edge position and edge columns of destination array 195 may be stored together as a lookup table. As discussed above, a DBMS implementation may have native mechanism(s), such as chunked caching, that make a separate lookup table unnecessary.

Parallel populating of destination array 195 may occur in any temporal order. For example, the bottom row of destination array 195 may be written temporally before the top row is written, or vice versa. As presented later herein, a racing implementation of step 208 does not depend on what order are edge rows retrieved from edge table 181, nor in what order are edges processed by step 208. For example in various multithreaded embodiments, some or all of the following may not matter:
- whether adjacent entries of destination array 195 are each processed by a same or separate thread, nor
- whether entries processed by a same thread are adjacent in destination array 195, nor
- whether edges of a same source vertex are processed by a same thread, nor
- whether a same thread processes edges of different source vertices.

Due to such relaxed constraints on populating destination array 195, racing is encouraged and no master thread is needed for central coordination. Thus, techniques presented elsewhere herein achieve maximum throughput, such as with atomic instructions that mitigate contention. After step 208, the CSR(s) are ready to use. In an embodiment, a CSR is made read only after step 208.

3.0 EXAMPLE PARALLEL POPULATION OF DESTINATION ARRAY

Figure 3:
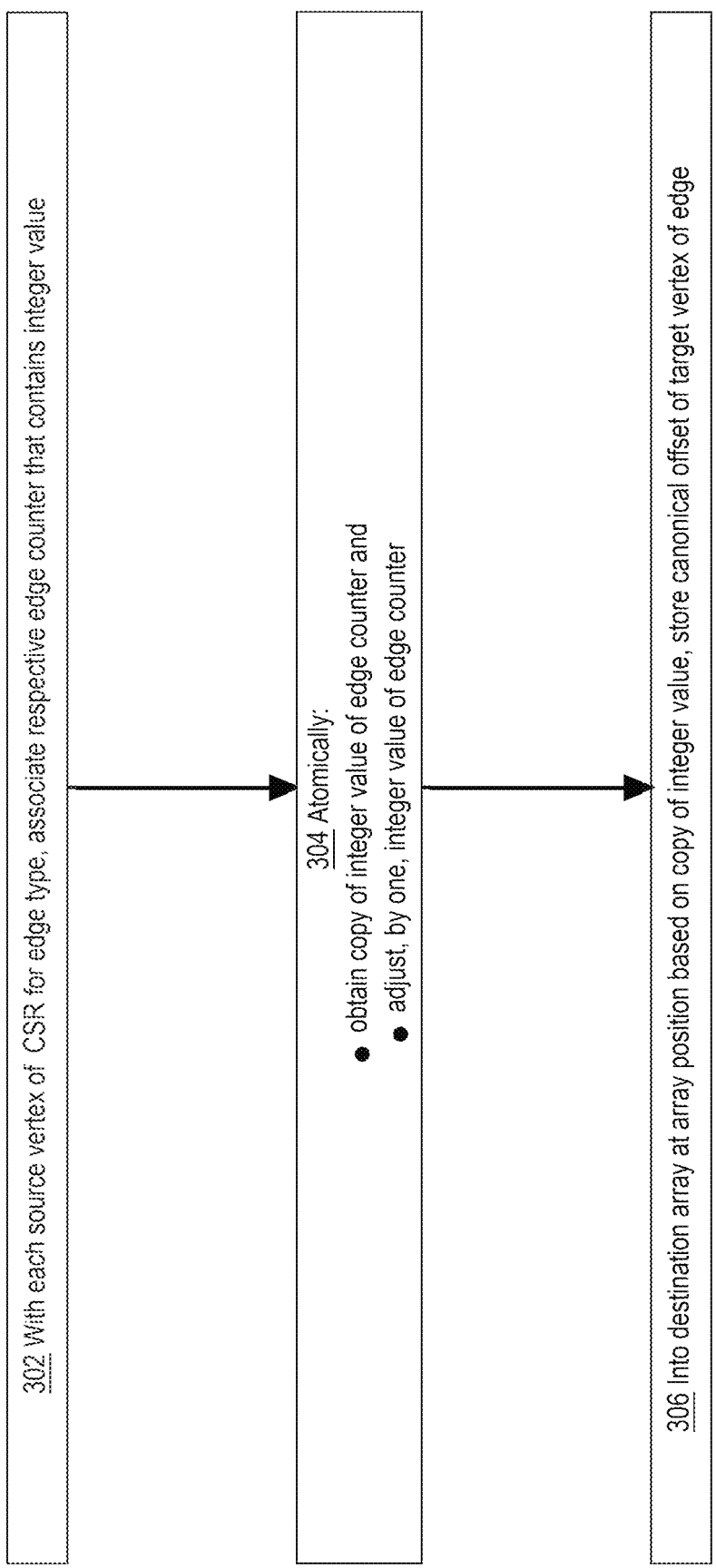
FIG. 3 is a flow diagram that depicts an example process that populates entries of a destination array of a CSR in parallel.

FIG. 3 is a flow diagram that depicts an example process that computer 100 may perform for populating entries of destination array 195 in parallel. FIG. 3 is discussed with reference to FIGS. 1-2 and may provide an implementation of step 208 of FIG. 2. Thus in various embodiments, some or all limitations and/or features presented in the above description of step 208 also apply to some or all of the steps of FIG. 3. For example, step 206 may be a prerequisite of step 208 and thus also a prerequisite of the process of FIG. 3. Parallel population of portions of source array 190 is presented later herein.

The process depicted in FIG. 3 tolerates multithreaded population of destination array 195 thereby facilitating concurrent loading of many edges of a same edge type. For example, loading of edges may be delegated, individually or by batch, to multiple threads. Irrelevant are the ordering of edges as retrieved from edge table 181 and the temporal ordering of edge population into destination array 195, in an embodiment. For example, edges are not expected to be grouped by source vertex in edge table 181. However, later herein is an embodiment that groups edges by source vertex when retrieving edge rows from edge table 181.

With each source vertex of a CSR for an edge type, step 302 associates a respective edge counter that contains an integer value. For example, a counter vector may have as many counters as vertices in source array 190. In an embodiment, each counter starts at zero and counts upwards by one. In an embodiment, each counter counts downwards by one and is initialized with a count of edges of the edge type that originate from a same corresponding source vertex.

Step 304 atomically together performs both of: a) obtaining a copy of an integer value of an edge counter and b) adjusts, by one, the integer value of the edge counter. Depending on the embodiment, different counters in a same counter vector may be concurrently accessed more or less without concern for thread safety.

However, because an individual counter may be corrupted or misread by contentious use by multiple threads, counter access should be protected. In an embodiment, a counter is protected by an atomic instruction such as fetch-and-add. In other words, underlying hardware and its dedicated atomic instruction of an instruction set architecture (ISA) can provide thread safe and simultaneous reading and adjustment of a counter by a same thread in the presence of other threads that contentiously race to atomically read and adjust the same counter.

Instead of an atomic instruction, an embodiment may use a memory synchronization instruction such as a barrier instruction of an ISA, such as a fence instruction that flushes (i.e. write back) to global memory and/or reloads, into local memory of each thread or processing core, some or all shared data. An advantage of an atomic instruction such as fetch-and-add is that synchronization is non-blocking for higher throughput. Blocking synchronization may instead be used, such as with a mutex or semaphore, such as with a critical section.

Although two edge types may have a same source vertex type, the two edge types have separate CSRs, separate source arrays of a same length, and thus separate counter vectors of the same length. Use of a counter vector does not depend on how edges are distributed to threads. Each thread iterates through its assigned edges or fetches a next edge or batch of edges from a backlog of unprocessed edges of a same edge type. In any case, each thread processes one edge at a time as follows.

Step 304 detects which is the source vertex of the currently processed edge and which is the offset of that vertex in source array 190. That same offset is used to access a particular counter in the counter vector. The particular counter is atomically read and incremented.

Step 306 reuses that same offset to read a value in the edge position vector in source array 190. That edge position value is a base offset where the subsequence of rows begins in destination array 195 for edges of edge type 151 that originate at the particular source vertex of the current edge. Arithmetically adding that base offset and the read counter value derives a canonical offset into destination array 195 into which the current edge can be stored. Thus, each thread can autonomously calculate where to store any edge into destination array 195. After step 306, destination array 195 is ready to use, and the counter vector may be discarded. An embodiment makes destination array 195 read only after step 306.

4.0 EXAMPLE PARALLEL MAPPING OF VERTEX PERSISTENT IDENTIFIERS

Figure 4:
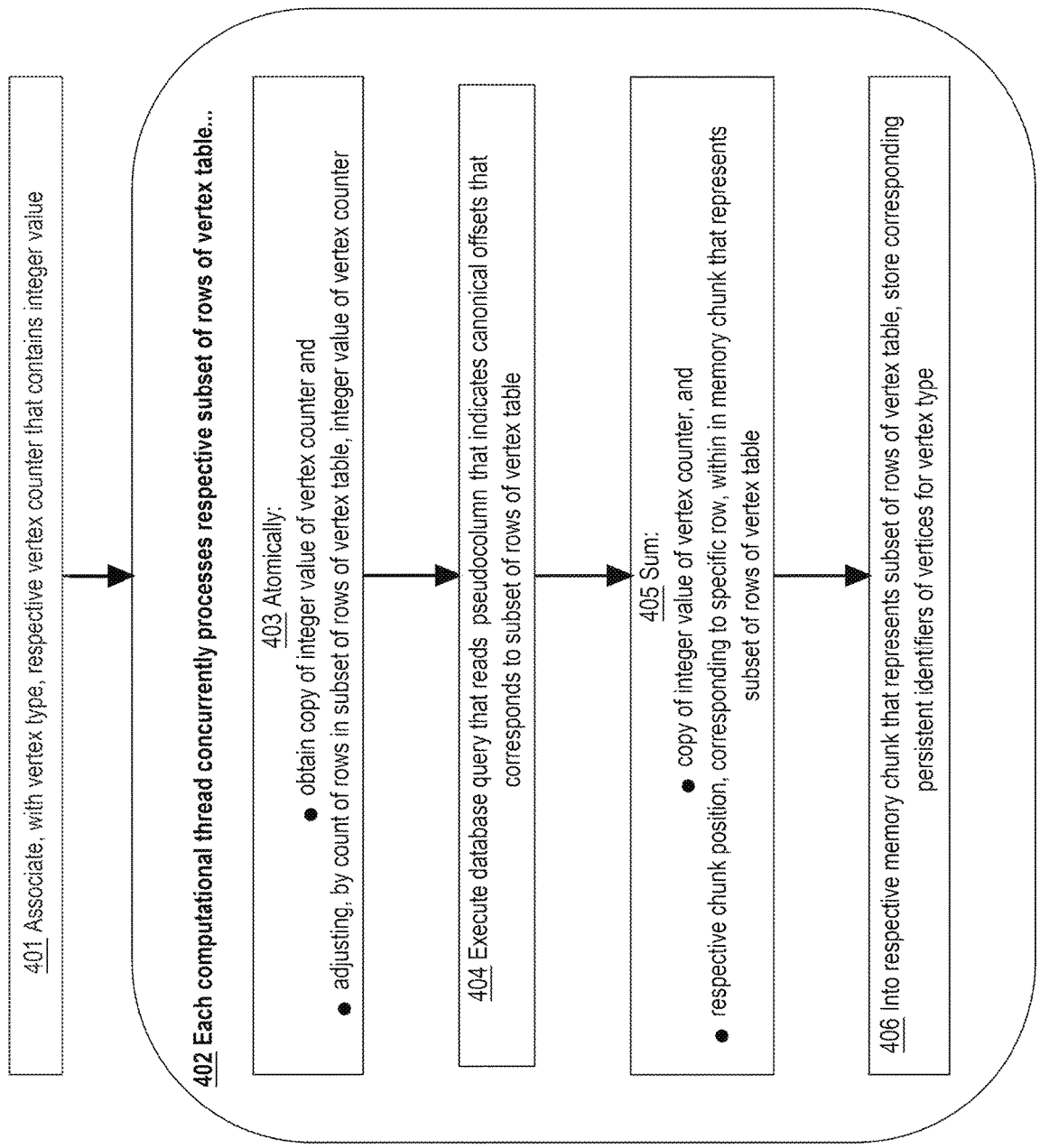
FIG. 4 is a flow diagram that depicts an example multi-threaded process that populates a lookup table in parallel batches for vertex persistent identifiers.

FIG. 4 is a flow diagram that depicts an example process that computational thread(s) of computer 100 may perform for populating a lookup table in parallel batches for vertex persistent identifiers. FIG. 4 is discussed with reference to FIGS. 1-2 and may be a partial implementation of steps 204 and 206.

As presented earlier herein, a property vector may store all values of a property of a graph element type contiguously in memory. However in memory, an implementation may store any array, such as property vector(s) or lookup tables, in segments known herein as chunks that need not be contiguous. In an embodiment, populating or later using a chunk may be assigned as a unit of work to a thread.

Each chunk will or already does contain a horizontal slice that is contiguous portion of a vector or array. If a chunk comes from a tabular array, the chunk may also be a vertical slice with some or all columns of the array. That is, a slice may contain one or more vectors that are accessed by a same canonical offset for a same vertex or edge.

While each vector is internally contiguous, multiple vectors in a same chunk need not be contiguous. Although the following process populates multiple chunks in parallel, an individual chunk may be internally processed sequentially. The following process populates a chunked lookup table that maps canonical offsets to persistent identifiers of one vertex type. Later herein is a somewhat similar process for an edge type.

Step 401 is preparatory and performed by a controller such as a master thread. Step 402 and its sub-steps are performed by each of many threads.

Step 401 associates, with a vertex type, a respective vertex counter that contains a non-negative integer value that is initially zero and ascending in increments of a fixed or varied amount. Somewhat similar to counter thread safety presented earlier herein, an atomic instruction may be used for counter integrity protection as discussed below.

Step 402 has sub-steps 403-406. In step 402, each of many threads concurrently processes a respective subset of rows of one vertex table of a relational database. Simultaneously, different threads may perform different respective sub-steps. If there is a backlog of unprocessed chunks because of fewer threads than chunks, than a thread that finishes a chunk may take and process another chunk until all chunks are processed.

Step 403 atomically: a) obtains a copy of the integer value of the vertex counter of the vertex type and b) adjusts, by a count of rows in the subset of rows of the vertex table, an integer value of the vertex counter. In an embodiment, an atomic fetch-and-add instruction is used, where the value of an addend operand of the instruction is the count of rows in the subset of rows. The copy of the value of the vertex counter returned by the instruction becomes the canonical offset of the first vertex in the chunk.

Each subsequent vertex in the chunk has a canonical offset that is one greater than the previous vertex in the chunk. The chunk may have metadata into which the copy of the integer value of the vertex counter may be stored as the canonical offset of the first vertex in the chunk. Canonical offsets of other vertices in the chunk are implied instead of stored in the chunk and can be calculated per step 405 below.

Step 404 executes a database query that reads a pseudocolumn of the vertex table that indicates canonical offsets that correspond to the subset of rows of the vertex table. The pseudocolumn may be somewhat unstable such that reloading graph 105 may cause the pseudocolumn to return a different canonical value for a same vertex than was returned before reloading.

An embodiment need not use a pseudocolumn to discover canonical offsets of rows. For example, an embodiment may introduce a database operator, such as a built in function or other query operator, that may return a canonical offset based on a row identifier or a primary key. In an embodiment, the database operator may accept a row identifier or a primary key as a parameter. In an embodiment, the row identifier or primary key is implied. For example, the database operator implementation may automatically obtain a row identifier or a primary key.

Step 405 sums: a) the chunk's copy of the integer value of the vertex counter and b) respective chunk position, as a relative offset corresponding to a specific vertex, within the chunk that represents the subset of rows of vertex table. For example if a chunk has ten vertices, then each vertex has a relative offset of 0-9 respectively. For example if the first vertex in the chunk has a canonical offset of 8000, as recorded in metadata of the chunk, then the canonical offset of the last vertex in the chunk sums as 8000+9=8009.

Into the chunk that represents the subset of rows of the vertex table, step 406 stores corresponding persistent identifiers of vertices of the vertex type. Steps 404-406 work together and may be more or less combined such that: a) step 404 informs a database management system (DBMS), hosted on computer 100 or another computer, that canonical offsets and persistent identifiers are needed, b) step 405 is how those canonical offsets are calculated such as by the DBMS, and c) step 406 stores the persistent identifiers as a vector in the chunk for vertices in a same ordering as the vertices' canonical offsets.

After step 406, the chunk may become read only and/or used as a lookup table to obtain a persistent identifier of a vertex in the chunk based on an offset for the vertex that may be either: a) a canonical offset or b) a relative offset into the chunk's persistent identifier vector. For example for a given chunk, computer 100 can bidirectionally convert between the canonical offset and the relative offset as needed based on the context.

5.0 EXAMPLE PARALLEL MAPPING OF EDGE PERSISTENT IDENTIFIERS

Figure 5:
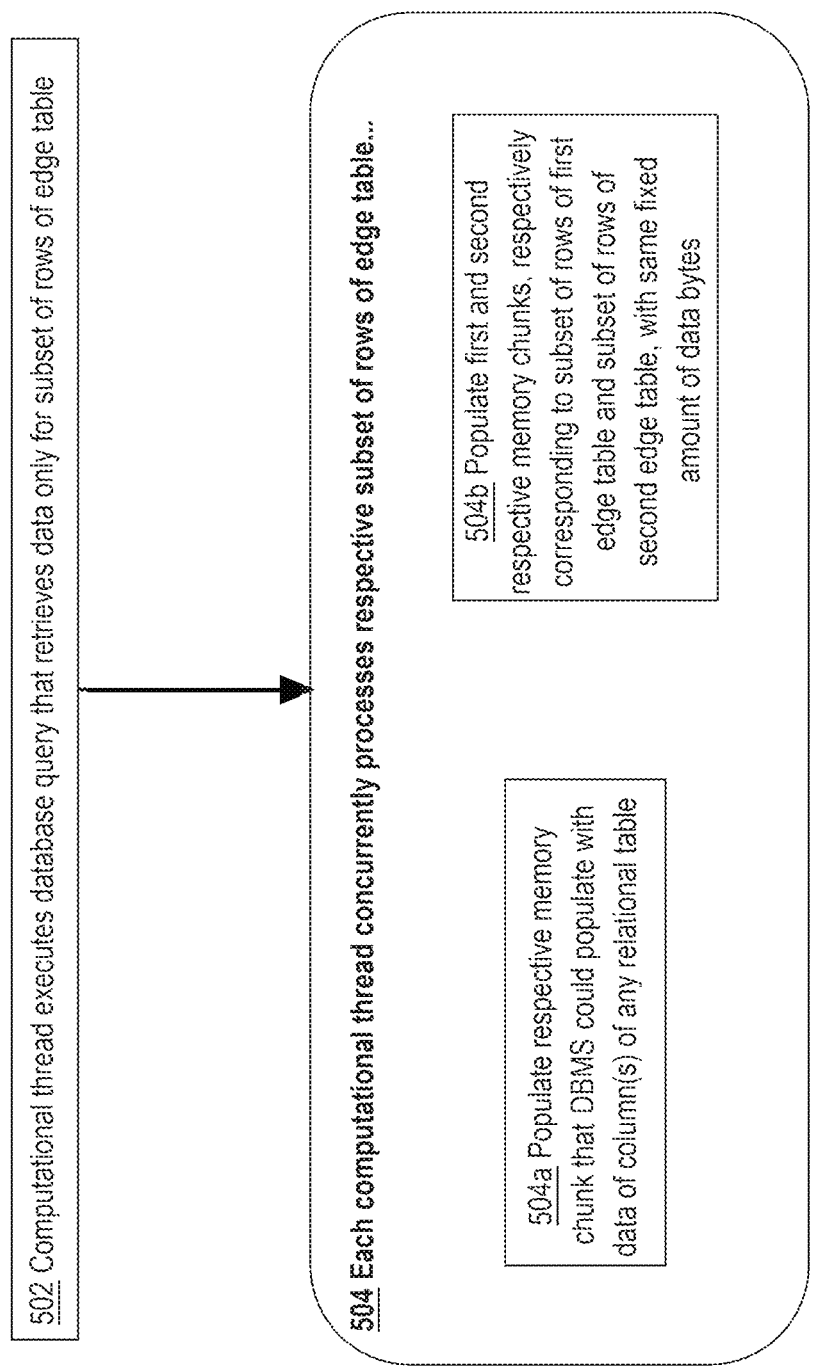
FIG. 5 is a flow diagram that depicts an example multi-threaded process that populates a lookup table in parallel batches for edge persistent identifiers.

FIG. 5 is a flow diagram that depicts an example process that computational thread(s) of computer 100 may perform for populating a lookup table in parallel batches for edge persistent identifiers. FIG. 5 is discussed with reference to FIGS. 1-4.

Some of the features of the process of FIG. 5 are similar to those in FIG. 4. FIG. 4 populated chunks for vertices in parallel. FIG. 5 populates chunks for edges in parallel.

Steps 502 and 504 and its sub-steps are performed by each of many computational threads. Step 502 is preparatory. In step 502, each thread executes a database query that retrieves data only for the thread's respective subset of rows of a same edge table, which may be based on a thread safe edge counter that is used in a similar way as the thread safe vertex counter for FIG. 4. The edge table may have a pseudocolumn for canonical edge identifiers and may operate more or less as discussed earlier herein for a vertex table. As explained earlier herein, an embodiment may have a database operator that is more or less semantically equivalent to such a pseudocolumn and used instead of the pseudocolumn.

Depending on the embodiment and/or scenario, both or only one of sub-steps 504a-b may occur. Step 504a populates a respective memory chunk whose lifecycle is managed by a DBMS that may or may not be hosted on computer 100. Unless populated with content, an empty or unused chunk is polymorphic such that the chunk may later be filled with vector(s) of kinds of data that depend on the scenario. In an embodiment, a chunk could be populated by the DBMS, for a graph or not, with data of column(s) of any relational table such as: a vertex table, an edge table, or a table that is neither a vertex table nor an edge table.

Various embodiments may have different respective mechanisms and policies for managing chunk lifecycles. In an embodiment, the DBMS maintains a pool of unused chunks that can be allocated, for a graph or not and for a same client or not, and filled when needed and returned to the pool when no longer needed for eventual repurposing. In another embodiment, a cache may contain a fixed or elastic amount of chunks that can be repurposed according to a cache policy such as least recently used (LRU).

For example, eviction of a chunk may entail retaining the chunk in the cache and immediately repurposing the chunk to store other content than before. A database administrator (DBA) manually and/or the DBMS autonomously may statically preset and/or dynamically adjust: which relational tables and/or graph element types can be cached and/or chunked, b) how much bytes or chunks a relational table or graph element type may respectively use, and/or c) a total amount of bytes or chunks, such as a size of the cache.

In another embodiment, chunks are created and destroyed without being recycled. In any case, chunks may have different or same amounts of: bytes, multibyte values, and/or rows such as graph elements.

In step 504b a same or different threads at a same or different times populate first and second respective memory chunks, respectively corresponding to a subset of rows of a first edge table and a subset of rows of a second edge table, with both chunks storing a same fixed amount of data bytes even though the first and second subsets of rows may have different amounts of rows.

After step 504, a chunk may become read only and/or used as a lookup table to obtain a persistent identifier of an edge in the chunk based on an offset for the chunk that may be either: a) a canonical offset or b) a relative offset into the chunk's persistent identifier vector. For example for a given chunk, computer 100 can bidirectionally convert between the canonical offset and the relative offset as needed based on the context.

6.0 EXAMPLE EMBODIMENT

Here is an exemplary embodiment based on a modern relational DBMS (RDBMS) such as Oracle. This embodiment refines the previous examples that may further explain this embodiment. Thus, the following explanation of this embodiment is abridged to emphasize refinements. Limitations of this embodiment that are explained as requirements need not be requirements of the previous examples.

6.1 CSR POPULATION

CSR population is performed in three main steps:
1. Source table and destination tables main memory population and, at the same time, the creation of the mapping between vertices primary keys (PK) and identifiers (ID) used in the CSR happens.
2. CSR data structure initialization.
3. Fill the CSR with content.

Above steps 1 and 3 use parallelism that is made possible by decomposing each operation in a CSR population into memory chunks. Data from a table row will not span multiple chunks. Chunks have a fixed amount of bytes. Each chunk may hold data for a different number of rows, depending on various factors (e.g., level of compression achieved for the data of the rows etc.).

This embodiment makes no assumption on how data is stored within a chunk (dictionary encoding, other form of compression, etc.). It only requires that data is organized in some columnar representation allowing all columns values for a particular row to be associated with a same index that is unique within the chunk, and allocated from a dense range of integer value, starting from 0 to the number of rows in the chunk.

The DBMS provides a physical identifier for a row that can be queried using a pseudo column, e.g., the ROWID pseudo column in Oracle or IBM Db2, and range predicate over ROWID values are possible (e.g., ROWID>=x AND ROWID<=y).

Each chunk has a metadata header associated to it, which contains useful information about the chunk itself, like the number of rows stored in it, and information allowing to identify the range of ROWIDs for the rows stored in the chunk.

Loading of rows into an in-memory store in columnar format is done in parallel, such that each chunk can be populated independently of others when performing the optional population of vertex (or edge) tables in step 1 (or 3 if edges) of the CSR population.

Building the CSR for an edge table is done in parallel: each chunk of the edge table is processed independently of others during CSR construction, with only non-blocking synchronization to assign entries in the destination array of a CSR (step 2).

Depending on the database system, parallelism can be achieved using processes, or lightweight threads, or a combination of both. For example, in the Oracle database, parallelism in steps 1 and 3 are performed using background processes, coordinated with a CSR master process that also is a background process. The CSR master process ensures the synchronization between the steps and assign chunks to the different population processes.

In case the RDBMS already presents a chunk based main memory parallel loading mechanism (as is the case for the Oracle with its in-memory columnar option), this embodiment can seamlessly integrate with it to add the operation specific to CSR construction and exploit the existing parallel loading framework.

6.2 VERTICES ROW AND ID MAPPING

This embodiment additionally aims at supporting a graph atop a pre-existing database (e.g., legacy databases at existing client). This embodiment does not expect that tables already have a column with a unique integer value per row from a dense range that can already be used as an index.

Instead, this embodiment exploits an aspect of an in-memory columnar database, such that table data is organized into main-memory arrays of column values, with one array per column of a table. The columns of a given row for a table are located at the same position in each of the array holding the values of the columns. That position can act as a unique row identifier in the columnar representation. In a dual store system, where rows are primarily stored on disk in row format and the in-memory columnar store may be used optionally to cache some of the columns of a table, that position is only defined for a table with a copy in the in-memory store. When the in-memory store is organized in chunks, the position can be relative to the beginning of the chunk. Further, the in-memory store maintains a mapping between the physical address of a row on disk (e.g., a ROWID in Oracle) and the position assigned to that row in the chunk of the in-memory column store holding the column values of that row.

This embodiment exploits that relative position to provide vertex and edge elements in an in-memory graph with a unique identifier that can act as an index to the arrays used in a CSR and can be used in queries for building CSRs as follows.

A new pseudo column called IMGTID (In-Memory Graph Topology ID) is defined by the DBMS. A pseudo column behaves like a table column, but is not actually stored in the table. Users cannot insert, update, or delete their values. The IMGTID pseudo column is defined only for an in-memory table. Any attempt to use an IMGTID for a table that is not in-memory raises an error. An IMGTID is a canonical offset as presented earlier herein.

Step 1 of the CSR population computes the IMGTID of the first row of every chunk and stores it in the metadata associated to the chunk. Step 1 can face two different cases: the tables are not in-memory yet (or not all the columns composing the vertex PK are in-memory yet) or the tables are in-memory (all the PK columns are in-memory). IMGTID metadata creation may work for a vertex table in the two different above scenarios.

In the first case, the IMGTIDs are created at the same time the vertices are loaded in-memory via processes asynchronously running in the background. A counter is shared by all these processes and atomic increment operations are used to reserve a contiguous range of IMGTID values.

In the case where the vertex table is already in-memory and all the PKs columns are loaded too, the task is assigned to a foreground process which iterates over all the chunks and simply sets the minimum vertex id for each chunk.

Following step 1 of CSR population, queries against the vertex table can use the IMGTID pseudo column. This is exploited in the next steps of the CSR population, as further detailed below.

6.3 CSR DATA STRUCTURE INITIALIZATION

Step 2 is executed by the CSR master process itself. It allocates the CSR data structure that will be filled up in step 3 and all the auxiliary data structures that will be exploited by the background processes used in step 3. Step 2 first retrieves the following information: the number of source vertices, the number of edges, and the number of destination vertices. This can be done using the following three queries:
    select count(*) from source_vertex_table;
    select count(*) from edge_table;
    select count(*) from destination_vertex_table;

The source vertex table size and the edge table size facilitate allocating a CSR data structure with a source array of the same size of the vertex table size+1 (in order to have an extra slot to store the total amount of edges for the CSR) and a destination array of the same size of the edge table size. Also stored in the CSR metadata is information about the source, edge, and destination table unique identifiers from the RDBMS in order to retrieve them quickly when requested (e.g. for a graph query or graph algorithm). Then, the CSR source array is initialized by executing the following query:
    select IMGTID, count (ET.source_fk1)
    from (select IMGTID, source_pk1, source_pk2, . . . ,
    source_pkN from schema.source_vertex_table) ST
    left outer join schema.edge_table ET on
    ST.source_pk1=ET.src_fk1 AND
    ST.source_pk2=ET.src_fk2 AND
    . . . AND
    ST.source_pkN=ET.src_fkN
    GROUP BY IMGTID
    ORDER BY IMGTID The above query is generated using the metadata describing the graph and the tables composing the graph. This allows, in particular, to customize the query to the specific primary/foreign key (FK), which may be composite, between a source vertex table and the edge table.

The above query fetches, for each vertex, the value of the IMGTID pseudo column (which can be used as a canonical offset into the CSR source array) and the count of neighbors (edges) outgoing from the vertex. That count may be used to calculate the offset stored in the source array for each vertex by summing the retrieved count of neighbors to the previous count stored at position (IMGTID-1) in the source array.

Step 2 is completed by allocating a temporary array unassigned neighbor position (unp), which may be an implementation of the counter vector presented earlier herein for FIG. 3. An unp is a temporary structure that provides thread safety during population of the CSR destination array, after which the unp may be discarded. This array has a size equal to the size of the CSR source array (i.e. number of elements in the source vertex table).

The entries of the unp array should allow storing integer values in a way amenable to a non-blocking atomic instruction (e.g., atomic compared-and-swap). Each entry of the array holds the value of the next unassigned position in the list of neighbors of a source vertex. That is, assuming a vertex with IMGTID i, then unp[i] holds a value between 0 and the number of outgoing edges from vertex i. The unp array is initially zero-filled and will be used in step 3 to construct the destination array of the CSR.

6.4 CSR CONSTRUCTION

Step 3 is performed by several background processes. These processes create the IMGTID pseudo-column also for the edge table and they work on the data in the same chunk fashion described in the previous section. These processes introduce the neighborhood initialization step, which entails populating the CSR destination array and so finalizing its construction.

This step mainly consists in executing the following query and exploiting its return values:
    select ET.IMGTID, SRC_VID, DST_VID
    from (select IMGTID as SRC_VID, source_pk1, source_pk2, . . . ,
    source_pkN from schema.source_vertex_table) ST,
    schema. edge_table ET,
    (select IMGTID as DST_VID, destination_pk1,
    destination_pk2, . . . , destination_pkN from schema.
    destination_vertex_table) DT
    where
    ST.source_pk
    1=
    ET.src_fk1
    AND
    ST.source_pk
    2=
    ET.src_fk2
    AND
    . . . AND
    ST.source_pkN=
    ET.src_fkN
    DT.destination_
    pk1=
    ET.dst_fk1 AND
    DT.destination_
    pk2=
    ET.dst_fk2 AND
    . . . AND
    DT.destination_pkN=ET.dst_fkN AND
    ET.ROW_ID>=edge_chunk_min_row_id AND
    ET.ROW_ID<=edge_chunk_max_row_id The above query returns three values:
ET.IMGTID (the IMGTID for the edge),
SRC_VID (the IMGTID for the source vertex of this edge), and
DST_VID (the IMGTID of the destination vertex for the edge).

The above query returns only results for the edges being part of the chunk assigned to the process. This is possible due to the last condition, which limits the query to perform the JOIN only for the rows within a distinct identifier range. The boundaries for this range can be retrieved by reading the RDBMS metadata information for the edge table chunk.

SRC_VID (the source IMGTID) is used to retrieve the offset for the current source vertex, the index in the CSR destination array where the vertex neighbors list starts. Then, the same IMGTID can be used in order to perform an atomic 'fetch_and_add' for the element stored in the previously allocated unp array. Summing the retrieved offset and the fetched value detects exactly which slot of the CSR destination array is available to store the destination IMGTID retrieved by the query.

This CSR implementation contains also a third array known herein as a CSR edge array, which contains the edge IMGTID for each edge of the edge type of the CSR. This speeds up edge row retrieval for queries and algorithms. The CSR edge array is where the edge IMGTID is stored. The position in which storing IMGTID for the current edge it is exactly the one previously computed, since there is a 1 on 1 mapping between the CSR destination array and the CSR edge array.

Once all the background processes for this step are complete, there is a CSR fully populated in-memory, presenting all the properties and the benefits described earlier herein.

6.5 CSR MASTER BEHAVIOR

The CSR master process is in charge to ensure the synchronization and also to dispatch all the background processes for the intermediate steps. Step one issues background processes for the source and vertex tables. The transition to step two can happen only when the populations and the IMGTID creation are completed by those background processes. Then the necessary data structures are allocated and initialized. After that background process(es) for the edge table are issued. Once the population for the edge completes the outgoing CSR is also completed.

7.0 DATABASE OVERVIEW

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines much of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, such as Oracle Database 11g. SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/WL is a common extension of SQL used when manipulating XML data in an object-relational database.

A multi-node database management system is made up of interconnected nodes that share access to the same database. Typically, the nodes are interconnected via a network and share access, in varying degrees, to shared storage, such as with shared access to a set of disk drives and data blocks stored thereon. The nodes in a multi-node database system may be in the form of a group of computers, such as work stations and/or personal computers, that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

7.1 QUERY PROCESSING

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
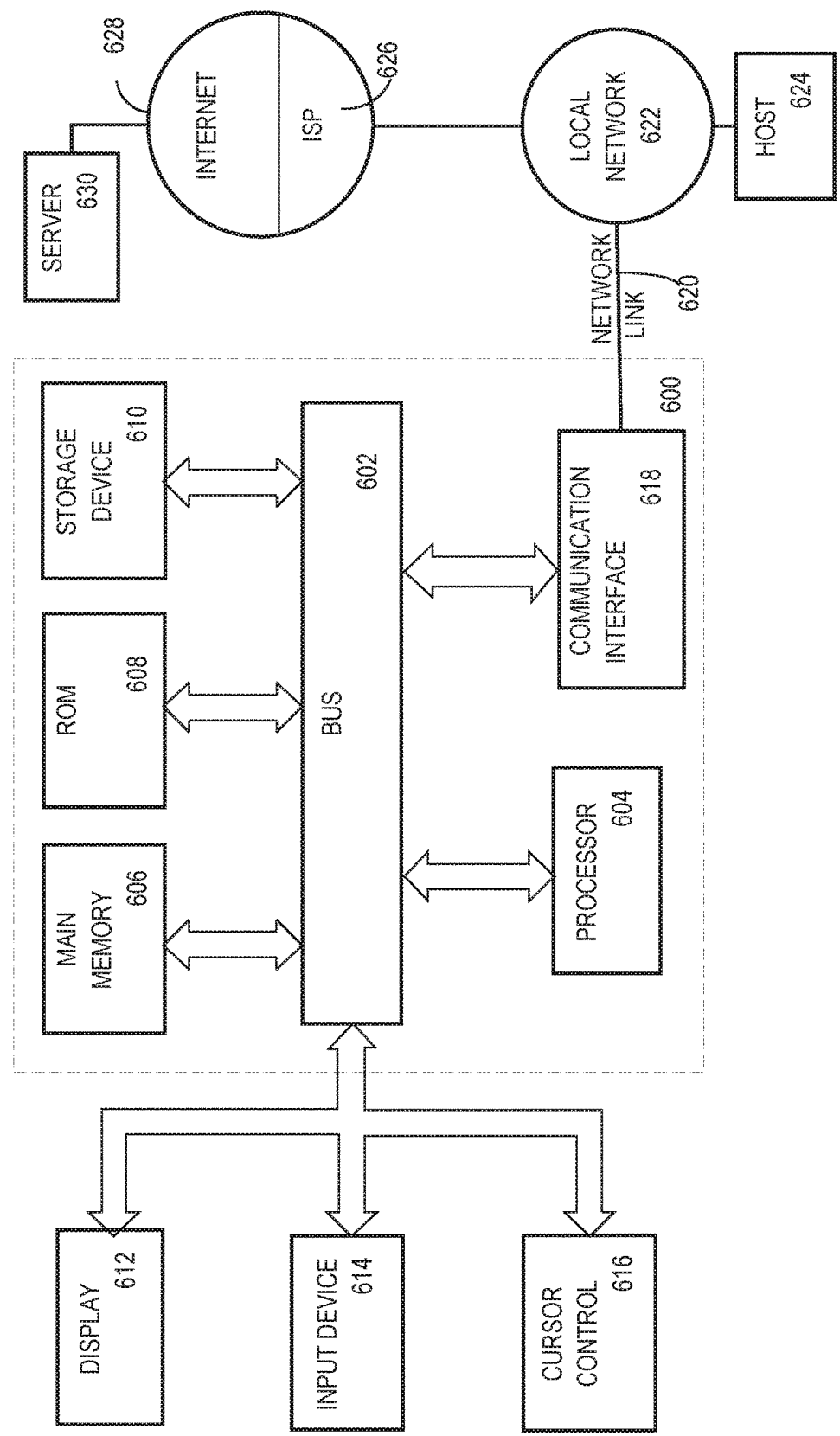
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Software Overview

Figure 7:
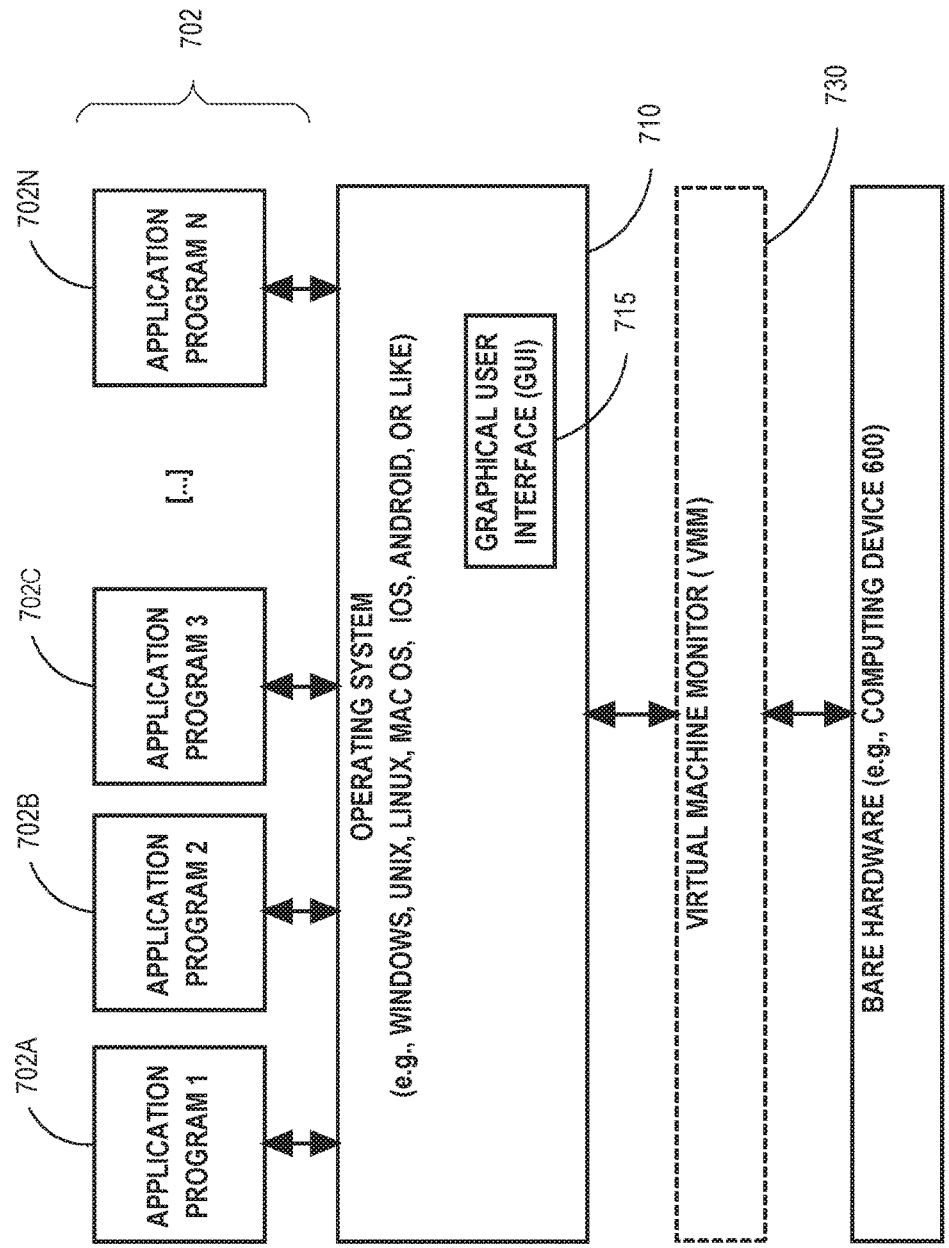
FIG. 7 is a block diagram that illustrates a basic software system that may be employed for controlling the operation of a computing system.

FIG. 7 is a block diagram of a basic software system 700 that may be employed for controlling the operation of computing system 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing system 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on computer system 600 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of computer system 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 700 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   obtaining a mapping of a relational schema to a graph data model, wherein:
      the relational schema defines a plurality of vertex tables that correspond to a plurality of respective vertex types in the graph data model and a plurality of edge tables that correspond to a plurality of respective edge types in the graph data model, and
      each edge type in the plurality of edge types is associated with a respective source vertex type of the plurality of vertex types and a respective target vertex type of the plurality of vertex types;
   obtaining, for each vertex type in the plurality of vertex types, a sequence of persistent identifiers of vertices for the vertex type;
   populating, based on said mapping and for a respective compressed sparse row (CSR) representation of each edge type in the plurality of edge types, a source array that, for a same vertex ordering as the sequence of persistent identifiers for the source vertex type of the edge type, is based on counts of edges of the edge type that originate from vertices of the source vertex type;
   for the CSR representation of each edge type in the plurality of edge types, populating, in parallel and based on said mapping, a destination array that contains canonical offsets as sequence positions within the sequence of persistent identifiers of vertices of the target vertex type of the edge type.

2. The method of claim 1 wherein said populating the destination array for the CSR representation of the edge type comprises for each edge of the edge type:
   associating, with each vertex of the source vertex type of the edge type of the CSR representation, a respective edge counter that contains an integer value;
   atomically: obtaining a copy of the integer value of the edge counter and adjusting, by one, the integer value of the edge counter;
   storing, into the destination array at an array position that is based on the copy of the integer value, a canonical offset of the target vertex type of the edge type.

3. The method of claim 2 wherein said atomically obtaining and adjusting comprises non-blocking synchronization.

4. The method of claim 1 wherein said populating the destination array for the CSR representation of the edge type comprises each computational thread of a plurality of computational threads concurrently processes a respective subset of rows of the edge table of the edge type to calculate said canonical offsets of the target vertex type of the edge type.

5. The method of claim 4 wherein:
   said plurality of edge tables comprises a first edge table and a second edge table that are selected from the group consisting of: different tables, and a same table;
   said subset of rows of said first edge table contains more rows than said subset of rows of said second edge table;

said processes said subset of rows of said first edge table and said processes said subset of rows of said second edge table comprises populating first and second respective memory chunks, respectively corresponding to said subset of rows of said first edge table and said subset of rows of said second edge table, with a same fixed amount of data bytes.

6. The method of claim 4 wherein said processes said subset of rows of said edge table comprises populating a respective memory chunk that a database management system (DBMS) could populate with data of column(s) of any relational table such as one selected from the group consisting of: a vertex table, an edge table, and a table that is neither a vertex table nor an edge table.

7. The method of claim 4 wherein said computational thread processes said subset of rows of the edge table comprises the computational thread executes a database query that retrieves data only for said subset of rows of the edge table.

8. The method of claim 1 wherein said obtaining the sequence of persistent identifiers for the vertex type comprises:
- associating, with the vertex type, a respective vertex counter that contains an integer value;
- each computational thread of a plurality of computational threads concurrently processes a respective subset of rows of the vertex table of the vertex type by:
  - atomically: obtaining a copy of the integer value of the vertex counter and adjusting, by a count of rows in said subset of rows of the vertex table, the integer value of the vertex counter;
  - storing into a respective memory chunk that represents said subset of rows of the vertex table: the copy of the integer value and a corresponding subsequence of persistent identifiers for the vertex type.

9. The method of claim 8 wherein the vertex table includes a pseudocolumn that, for a particular row of the vertex table, indicates said canonical offset of the vertex corresponding to said particular row.

10. The method of claim 9 wherein said storing said corresponding subsequence of persistent identifiers into said memory chunk comprises reading said pseudocolumn that indicates said canonical offset that corresponds to said particular row.

11. The method of claim 10 wherein said reading said pseudocolumn that indicates said canonical offset that corresponds to said particular row comprises summing:
- said copy of the integer value of the vertex counter, and
- a respective chunk position, corresponding to said particular row, within in said memory chunk that represents said subset of rows of the vertex table.

12. The method of claim 10 wherein said computational thread executes a database query that reads said pseudocolumn that indicates said canonical offsets that corresponds to said subset of rows of the vertex table.

13. The method of claim 8 wherein said memory chunk that represents the subset of rows of the vertex table comprises at least one selected from the group consisting of:
- primary key values of said subset of said rows of the vertex table, and
- storage row identifiers of said subset of said rows of the vertex table.

14. The method of claim 1 wherein said sequence of persistent identifiers of vertices of a vertex type comprises at least one selected from the group consisting of: primary key values of rows of the vertex table of the vertex type, and storage row identifiers of said rows of said vertex table.

15. The method of claim 1 wherein:
- said plurality of edge tables contains a first edge table and a second edge table that are selected from the group consisting of: different edge tables and a same edge table;
- said plurality of edge tables correspond to said plurality of respective edge types comprises said first edge table corresponds to a first edge type and said second edge table corresponds to a second edge type that is not the first edge type;
- said edges of the first edge type contains a first edge that is represented by a row of the first edge table;
- said edges of the second edge type contains a second edge that is represented by one selected from the group consisting of: a row of the second edge table and same said row of the first edge table.

16. The method of claim 1 wherein:
- a first graph and a second graph are based on same said graph data model;
- for said first graph and said second graph, said populating, for said CSR representation of each edge type in the plurality of edge types, said source array and said destination array is based on same said mapping of said relational schema to said graph data model.

17. One or more non-transitory computer-readable media storing instructions that, when executed by one or more processors, cause:
- obtaining a mapping of a relational schema to a graph data model, wherein:
  - the relational schema defines a plurality of vertex tables that correspond to a plurality of respective vertex types in the graph data model and a plurality of edge tables that correspond to a plurality of respective edge types in the graph data model, and
  - each edge type in the plurality of edge types is associated with a respective source vertex type of the plurality of vertex types and a respective target vertex type of the plurality of vertex types;
- obtaining, for each vertex type in the plurality of vertex types, a sequence of persistent identifiers of vertices for the vertex type;
- populating, based on said mapping and for a respective compressed sparse row (CSR) representation of each edge type in the plurality of edge types, a source array that, for a same vertex ordering as the sequence of persistent identifiers for the source vertex type of the edge type, is based on counts of edges of the edge type that originate from vertices of the source vertex type;
- for the CSR representation of each edge type in the plurality of edge types, populating, in parallel and based on said mapping, a destination array that contains canonical offsets as sequence positions within the sequence of persistent identifiers of vertices of the target vertex type of the edge type.

18. The one or more non-transitory computer-readable media of claim 17 wherein said populating the destination array for the CSR representation of the edge type comprises for each edge of the edge type:
- associating, with each vertex of the source vertex type of the edge type of the CSR representation, a respective edge counter that contains an integer value;
- atomically: obtaining a copy of the integer value of the edge counter and adjusting, by one, the integer value of the edge counter;
- storing, into the destination array at an array position that is based on the copy of the integer value, a canonical offset of the target vertex type of the edge type.

19. The one or more non-transitory computer-readable media of claim 17 wherein said populating the destination array for the CSR representation of the edge type comprises each computational thread of a plurality of computational threads concurrently processes a respective subset of rows of the edge table of the edge type to calculate said canonical offsets of the target vertex type of the edge type.

20. The one or more non-transitory computer-readable media of claim 17 wherein said obtaining the sequence of persistent identifiers for the vertex type comprises:
- associating, with the vertex type, a respective vertex counter that contains an integer value;
- each computational thread of a plurality of computational threads concurrently processes a respective subset of rows of the vertex table of the vertex type by:
  - atomically: obtaining a copy of the integer value of the vertex counter and adjusting, by a count of rows in said subset of rows of the vertex table, the integer value of the vertex counter;
  - storing into a respective memory chunk that represents said subset of rows of the vertex table: the copy of the integer value and a corresponding subsequence of persistent identifiers for the vertex type.

* * * * *